United States Patent
Rogers et al.

(10) Patent No.: US 6,395,238 B1
(45) Date of Patent: May 28, 2002

(54) METHOD AND APPARATUS UTILIZING ETHANOL IN NON-THERMAL PLASMA TREATMENT OF EFFLUENT GAS

(75) Inventors: John W. Rogers, Shalimar, FL (US); Allen J. Nejezchleb, Austn, TX (US); Glenn E. Rolader, Loganville, GA (US); Steven P. Federle, Mary Esther; Donald M. Littrell, Ft. Walton Beach, both of FL (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/621,850

(22) Filed: Jul. 24, 2000

Related U.S. Application Data

(63) Continuation of application No. 09/086,303, filed on May 28, 1998, now Pat. No. 6,139,694.

(51) Int. Cl.[7] ................................................ B01J 19/08
(52) U.S. Cl. .................................................... 422/186.04
(58) Field of Search .................................... 422/186.04

(56) References Cited

U.S. PATENT DOCUMENTS

| | | | |
|---|---|---|---|
| 5,545,380 A | | 8/1996 | Gray |
| 5,656,039 A | * | 8/1997 | Webster, III .................. 44/300 |
| 5,807,466 A | * | 9/1998 | Wang et al. .................. 204/177 |
| 5,827,488 A | | 10/1998 | Babu et al. |
| 5,837,867 A | * | 11/1998 | Lin et al. ....................... 44/329 |

* cited by examiner

*Primary Examiner*—Kishor Mayekar
(74) *Attorney, Agent, or Firm*—Sidley Austin Brown & Wood LLP

(57) ABSTRACT

An improved non-thermal plasma treatment method and apparatus for the pretreatment of nitric oxide-bearing exhaust gas with ethanol, either by vapor absorption or direct vapor injection, is described. Advantageously, the high vapor pressure of ethanol permits a significant portion of the ethanol to be absorbed. Moreover, the solubility of ethanol permits the ethanol to be readily scrubbed from the exhaust gas, along with the nitrogen dioxides converted from the nitric oxides. The non-thermal plasma apparatus comprises a non-thermal plasma reactor having a chamber which provides a plurality of electrodes. The apparatus further comprises an inlet and an outlet connected to the reaction chamber, permitting the exhaust gas to enter and leave the chamber. In one embodiment, the inlet is further connected to a diverter equipped with an injector, which diverts a portion of the gas stream through the ethanol bath before reinjecting the ethanol-bearing gas stream into the inlet.

6 Claims, 4 Drawing Sheets

METHOD AND APPARATUS UTILIZING ETHANOL IN NON-THERMAL PLASMA TREATMENT OF EFFLUENT GAS

RELATED APPLICATION

This is a continuation of application Ser. No. 09/086,303 filed May 28, 1998, now U.S. Pat. No. 6,139,694 METHOD AND APPARATUS UTILIZING ETHANOL IN NON-THERMAL PLASMA TREATMENT OF EFFLUENT GAS.

CONTRACTUAL ORIGIN OF THE INVENTION

The United States Government may have rights in this invention pursuant to the Cooperative Research And Development Agreement ("CRDA") between Science Applications International Corporation and the Air Force Wright Laboratory Armament Directorate.

FIELD OF THE INVENTION

This invention relates to an improved process and apparatus for treatment of hazardous gases, in particular, for the removal of $NO_x$ from gas streams resulting from various chemical processes and by the combustion of carbonaceous fuels, in a manner with improved efficiency and ease.

BACKGROUND AND SUMMARY OF THE INVENTION

The current global concern for the environment has generated a strong need by both government and industry for technologies that reduce emissions of $NO_x$. $NO_x$ are primary contributors to photochemical smog and acid rain, and may deplete the ozone layer. Up to millions of tons of nitrogen oxides, generally denoted herein as "$NO_x$," are emitted into the atmosphere each year as a result of numerous industrial and military processes, ranging from high temperature combustion of fossil fuels, to explosive manufacturing and munitions disposal processing and further to operations of powered aerospace ground equipment.

The impact of such emissions on human health and the environment in general has been the subject of intense study and public debate and legislative action to mandate safer emissions has already been enacted. For example, the Clean Air Act Amendment of 1990 mandates that emission generating industrial plants develop and/or implement techniques to significantly reduce their emissions of $No_x$. Such legislation affects power plants, iron and steel plants, pulp and paper mills, acid production plants, petroleum refineries, lime plants, fuel conversion plants, glass fiber processing plants, charcoal production plants, cement plants, copper smelters, coal cleaning plants, etc.

Developmental efforts have been directed to converting $NO_x$ to the individual elemental diatoms, $N_2$ and $O_2$. Conventional processes typically utilized thermal techniques for generating very high temperature conditions within a reactor. These techniques are highly inefficient as excessively high electrical power is needed not only to treat relatively low pollutant concentrations, but to cool the resultant effluent emerging from the reactor.

Electron beam irradiation has also been used in various forms to convert to the individual elemental diatoms. Such systems ALSO use electron beams or ultraviolet light to oxidize the $NO_x$. The ionization caused by the electron beam irradiation converts the $NO_x$ to acid mist at low temperatures and/or solid particles at high temperatures which may be removed by conventional methods employing filters and scrubbers. However, due to potential harm to operation personnel, costly and elaborate shielding measures must be employed.

Numerous research agencies have investigated the use of non-thermal plasma devices ("NTPDs") in processes that reduce NOX in gas streams. These techniques use exogenous reducing agents, such as ammonia ($NH_3$), methane ($CH_4$), or carbon monoxide (CO), or neutralizing agents, such as calcium hydroxide ($Ca(OH)_2$). The techniques have utility; however, they are accomplished with relatively low efficiency levels.

Accordingly, there exists a demand for non-thermal plasma method and apparatus for treating $NO_x$ bearing gas streams with significantly improved efficiency. It is also desired that such method and apparatus have significantly increased applicability and ease of application. In accordance with the present invention, a non-thermal plasma method and apparatus are employed, utilizing ethanol ($C_2H_5OH$) as a preinjectant in improving the efficiency of $No_x$ removal from effluent or exhaust gas. In certain instances, the efficiency (in terms of energy per molecule of remediated $NO_x$) and total reduction (in terms of percentage of hazardous compounds reduced per treatment pass) may be increased up to a factor of ten when compared with conventional non-thermal plasma method and devices.

The non-thermal plasma treatment of the instant invention involves the pretreatment of the exhaust gas with ethanol, either by vapor absorption or direct vapor injection. In particular, before the exhaust gas is exposed to the plasma chamber, at least a portion of the exhaust gas is exposed to an ethanol bath or an ethanol vapor injector such that ethanol vapor is absorbed into the exhaust gas. Advantageously, the high vapor pressure of ethanol permits a significant portion of the ethanol to be absorbed by the exhaust gas. As the ethanol-bearing exhaust gas is further exposed to the reactive species generated by the plasma reactor, e.g., oxygen atoms, nitric oxides are converted to a variety of products, including primarily nitrogen dioxide, with significantly improved efficiency. Moreover, the solubility of ethanol permits the ethanol to be readily scrubbed from the exhaust gas downstream of the plasma reactor, along with the converted nitrogen dioxide.

To implement these treatment methods, a non-thermal plasma apparatus is provided, comprising a non-thermal plasma reactor having a reaction or plasma chamber which provides the reaction zone defined by a plurality of electrodes and dielectrics. The apparatus further comprises an inlet and an outlet connected to the reaction chamber, permitting the exhaust gas to enter and leave the reaction chamber. In one embodiment, the inlet is further connected to a diverter equipped with an injector, which diverts a portion of the gas stream through an ethanol bath before reinjecting the ethanol-bearing gas stream into the inlet. Ethanol is readily absorbed by the gas stream as it passes through the ethanol bath.

In another embodiment, the inlet is equipped with an injector which receives a supply of ethanol that is sprayed as a fine mist directly into the gas stream. The fine mist of ethanol is substantially uniformly absorbed by the gas stream before it enters the reaction chamber. A reservoir stores the ethanol which is delivered to the injector by a metered pump.

The non-thermal plasma apparatus of the present invention may employ either embodiment depending on the concentration of ethanol to be used and/or the flow rate and temperature of the gas. Typically, direct injection of the ethanol into the gas stream is preferred where the temperature of the gas stream is relatively high, i.e., well above room temperature.

To provide the non-thermal plasma environment to which the ethanol-bearing gas stream travels, the electrodes and dielectrics of the plasma chamber are spaced apart from each other and arranged in a predefined pattern defining the reaction zone through which the gas stream travels. The dielectrics are configured relative to the electrodes to isolate them from the gas stream. A voltage supply is electrically configured to apply a predefined voltage across the electrodes to create microdischarges in the gas stream.

The non-thermal plasma treatment may be used for a variety of gas streams. A typical gas stream contains approximately nitrogen, oxygen, water vapor and nitric oxide. The primary function of the treatment is to convert the nitric oxide into nitrogen dioxide. As to be described below in further detail, the introduction of ethanol significantly enhances the efficiency of the conversion in terms of the electrical power required to drive the conversion. Moreover, upon completion of the conversion of nitric oxides to nitrogen dioxide in the plasma reactor, the nitrogen dioxide and the ethanol are readily scrubbed from the existing gas stream.

These, as well as other features of the invention, will become apparent from the detailed description which follows, considered together with the appended drawings.

DESCRIPTIONS OF THE DRAWINGS

In the drawings, which constitute a part of this specification, exemplary embodiments demonstrating various features of the invention are set forth as follows.

DESCRIPTION OF THE ILLUSTRATIVE EMBODIMENTS

As indicated above, detailed illustrative embodiments are disclosed herein. However, structures for accomplishing the objectives of the present invention may be detailed quite differently from the disclosed embodiments. Consequently, specific structural and functional details disclosed herein are merely representative; yet, in that regard, they are deemed to afford the best embodiment for purposes of disclosure and to provide a basis for the claims herein which define the scope of the present invention.

Figure 1:
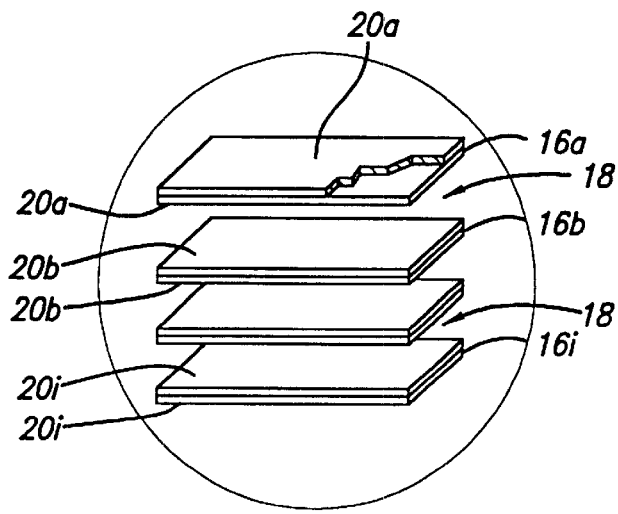
FIG. 1 is a perspective view of an embodiment of a non-thermal plasma apparatus of the present invention.

Referring to FIG. 1, a non-thermal plasma apparatus 10 for treating effluent or exhaust gas containing nitric oxides ("$NO_x$") is illustrated. The apparatus 10 includes a non-thermal plasma reactor 12 having a plasma chamber or reaction chamber 14 and a scrubber 15. An inlet 30 (shown partially broken away) is connected to the plasma reactor 12 to allow the exhaust gas to enter the plasma chamber 14. An outlet 32 connects the plasma reactor 12 to the scrubber 15, allowing the exhaust gas to move from the plasma chamber 14 to the scrubber 15, which may ultimately lead to a stack 17 to release the exhaust air from the apparatus.

A variety of exhaust gases may treated by the treatment and apparatus of the present invention. A suitable exhaust gas for treatment may contain 82% nitrogen, 15% oxygen, 3% water vapor, and approximately 1000 ppm nitric oxide (NO). A primary function of the treatment is to convert the nitric oxide (NO) into nitrogen dioxide ($NO_2$) and in accordance with a feature of the present invention, injection of ethanol ($C_2H_5OH$) into the exhaust gas significantly enhances the efficiency of the conversion in terms of the electrical power used to drive the conversion. The electro-chemical reaction driven by the electrical power converts the nitric oxide (NO) primarily to nitrogen dioxide (NO2) and some nitric acid (HNO3). In addition, small amounts of the compounds peroxy acetyl nitrate, acetaldehyde, and n-propyl nitrate are produced.

To facilitate such electro-chemical reactions, the reaction chamber 14 of the plasma reactor 12 includes a pair of plate electrodes 16a and 16b defining a reaction zone 18. A pair of dielectrics 20a and a pair of dielectrics 20b constructed of a nonconductive material are provided and configured to isolate the electrodes 16a and 16b, respectively, from the gas stream 22 passing through the reaction zone 18. Suitable material from which the dieletrics 20a and 20b may be constructed include quartz, glass, alumina, mullite, and oxide free ceramic such as silicon nitrite, boron nitrite, aluminum nitrite. However, fluoropolymers, such as fluorocarbons, commercially available under the names of Teflon®, Teflon® PFA, and Dykor®, may be particularly suited for such use as a dielectric and may be applied directly onto the surface of the electrode. Teflon®-coated plate electrodes are available from Toefco Engineering, Inc., Niles, Mich.

In accordance with a feature of the invention, the instant treatment and apparatus include an ethanol bath 24 to improve the efficiency of the conversion process. A voltage supply 26 is connected to the electrodes 16a and 16b to provide a voltage between the dielectrics 20a and 20b to drive the conversion of $NO_x$ to individual elemental diatoms $O_2$ and $N_2$ and/or nitrogen dioxide $NO_2$, in accordance with the present invention.

Guiding the gas stream in and out of the reaction chamber are an inlet 30 and an outlet 32. The main inlet 30 terminates at an entry X into the reaction chamber 12. To divert a portion 34 of the main gas stream 20 from the main inlet 30 into the ethanol bath 24, a diverter 36 is provided, having two sections 38 and 40. The first section 38 leads from the main inlet at point M prior to, or "upstream" from, the entry X into the reaction chamber 14, into point S submersed in the ethanol bath 24. The diverted gas stream 34 is therefore diverted from the inlet 30 directly into the ethanol bath 24.

Advantageously, due to the high vapor pressure of ethanol ($C_2H_5OH$), the ethanol is vaporized along with and mixed into the diverted gas stream 34. A relatively significant amount of ethanol ranging between 1000 to 75,000 ppm (e.g., a volume/molecular percentage ranging between 0.1 and 1.0, particularly a volume/molecular percentage of 0.8) may be absorbed into the diverted gas stream 34 in this manner to accomplish the improved conversion of nitric oxides to nitrogen dioxide.

After absorption of the ethanol, the diverted gas stream 34 is fed into or recaptured by the second section 40 of the diverter 36. The ethanol-absorbed diverted gas stream 34 is injected by an injector 42 back into the gas stream 22 traveling through the inlet 30, at injection point O to mix with the gas stream 22 "upstream" from, or prior to, the entry X into reaction chamber 14.

As the gas stream 22 mixes with the ethanol-absorbed diverted gas stream 34, a non-thermal plasma environment is prepared in the reaction chamber 12 to receive the ethanol-bearing or mixed gas stream. The non-thermal plasma environment of the reaction zone 18 contains reactive agents, in particular, energetic electrons, to drive selected electrical and/or chemical reactions which are discussed in detail further below.

Figure 2:
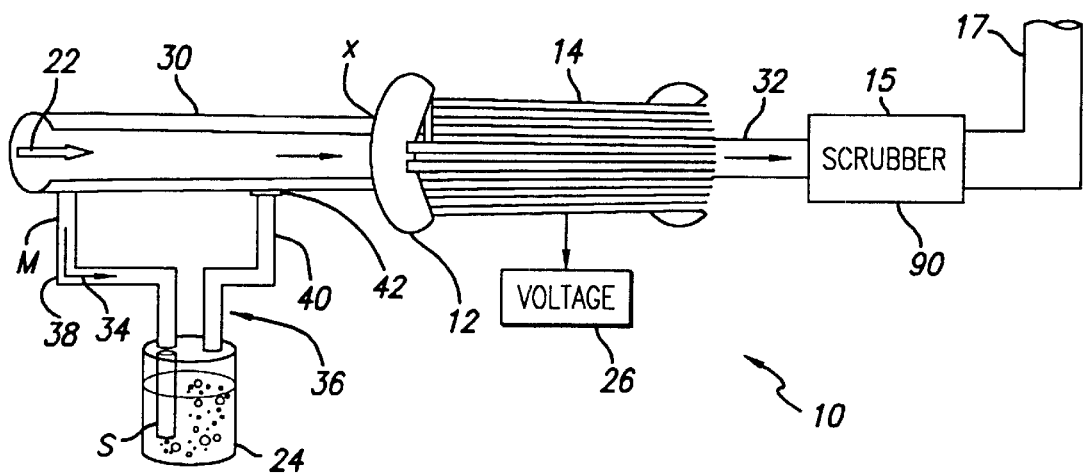
FIG. 2 is a perspective view of another embodiment of a non-thermal plasma apparatus of the present invention.
Figure 2:
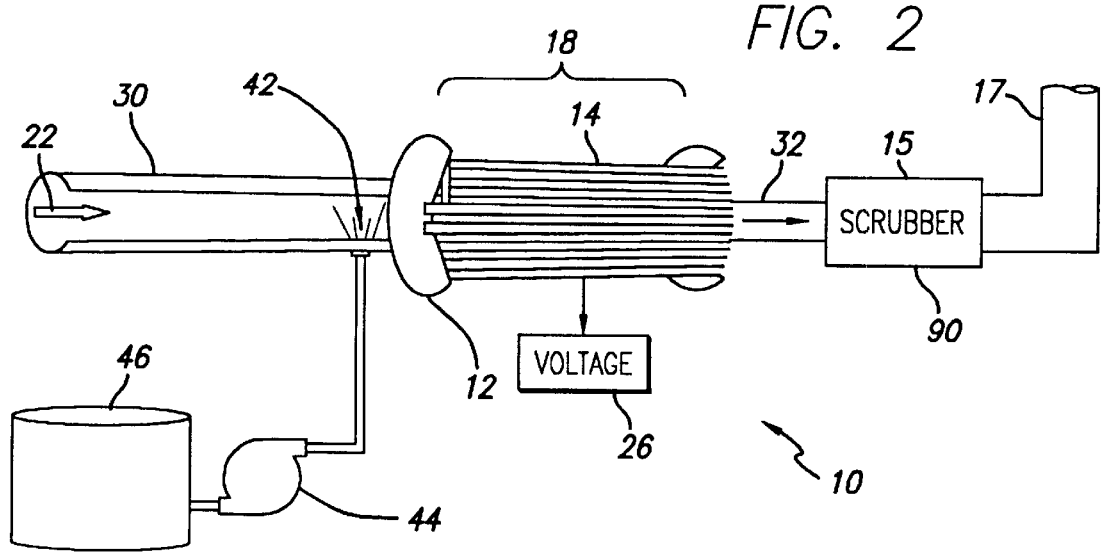

Referring to FIG. 2, an alternative embodiment of the non-thermal plasma apparatus is illustrated. In this embodiment, the inlet 30 remains connected to the reaction chamber 14 at the entry X. However, instead of diverting a portion of the gas stream 22 from the inlet 30, the gas stream 20 continues its travel through the inlet 30 until the injection point O, whereupon the injector 42 delivers the ethanol directly into the gas stream 22. The apparatus 10 employs a metered pump 44 which delivers the ethanol stored in a reservoir 46 to the injector 42. The ethanol is injected into the gas stream 22 as a fine mist that evaporates uniformly into the gas stream 22. A small varistaltic pump may be used to inject the ethanol. Such a pump is available from Manostat Corporation, Barrington, Ill., under Model #72-305-000.

For either of the described embodiments, the gas stream 22 which enters the reaction chamber 12 is an ethanol-bearing or mixed gas stream comprising the effluent or exhaust gas to be treated and the vaporized ethanol. In either instance, the voltage supply 26 applies voltage to the electrodes 16a and 16b such that a voltage between the dielectrics 20a and 20b is sufficient to establish an electric field having a field strength above the critical field strength of the mixed gas, but not so high as to establish a condition conducive to sustain arcing between the electrodes 16a and 16b. Rather, the voltage creates a multitude of short-lived current filaments or breakdown channels (commonly called microdischarges) within the mixed gas in the reaction zone 18. The electrical energy dissipated in these filaments is efficiently transferred to the electrons, accelerating them to energies on the order of approximately 5–10 eV. Such a voltage supply is available from Elgar Corporation, San Diego, Calif., under part #1001SL-11.

The resulting environment in the reaction zone 18 is non-thermal or "cool," and provides a dispersed electron charge or electric field (i.e., a "corona"), with a flow of electrons through the mixed gas stream. The electron density in the mixed gas stream is enhanced and the energetic electrons generated by the non-thermal plasma environment are significant to the operation of the apparatus 10. In particular, such charge dispersion and electron concentration promote electron-molecule collision, as opposed to molecule-molecule collision.

The flow of electrons at high velocity and in high density increase the likelihood of an $NO_x$ reduction producing collision. In particular, after a discharge extinguishes, the reactive species, e.g., oxygen atoms, diffuse out of the channels into the rest of the mixed gas stream in the reaction zone 18 where they drive the desired chemical reactions. Because the energy of the discharge is used to directly accelerate the electrons, rather than heating the gas stream, the apparatus 10 provides an attractive technique for selectively driving specific chemical reactions. In this regard, the apparatus 10 has applications beyond the specific chemical reaction discussed herein.

It bears emphasis that the plasma reactor 12 is non-thermal in that there is a cool discharge promoting the free flow of electrons. Significantly, only the electrons gain appreciable energy in the reaction zone 18 and hence increased temperature is experienced substantially only by the electrons, leaving the remaining constituents of the gas stream largely substantially unheated. The energy is generally evenly distributed over the entire reaction zone 18; any hot discharge is typically a localized point to point arc.

It is noted that the reaction chamber 14 may house more than the electrodes 16a and 16b and the corresponding dielectrics 20a and 20b. In particular, as illustrated in FIG. 1, the reaction chamber 14 may house a plurality of parallel plate electrodes 16i and dielectrics 20i. The electrodes 16i are configured to alternate between those that are positively-charged and those that are negatively-charged. Correspondingly, the dielectrics 20i are configured to isolate one or both sides of the electrodes 16i from the gas stream 20. The voltage supply 26 may supply voltage to all the electrodes 16i, such that a plurality of non-thermal plasma environments or reaction zones 18i are created therebetween.

Figure 3A:
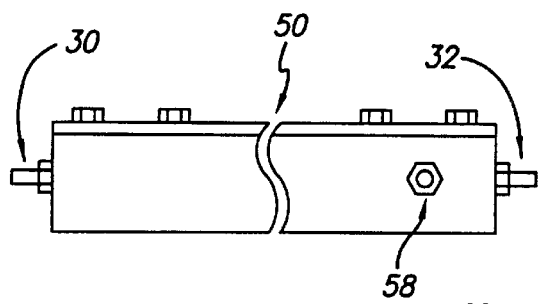
FIGS. 3A and 3B are a side elevational view and an end elevational view of an embodiment of a non-thermal plasma reactor utilizing planar electrodes.
Figure 3B:
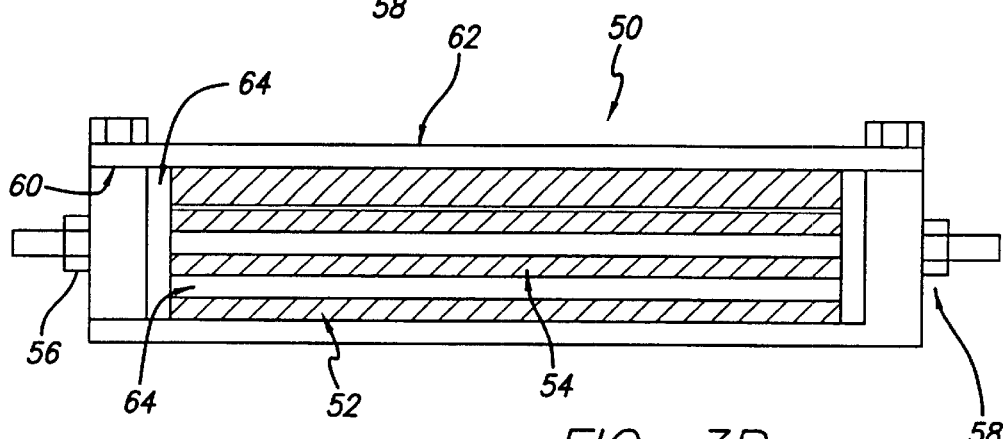

Referring to FIGS. 3A and 3B, an embodiment of the planar electrodes as applied in a planar, variable gap, double dielectric barrier non-thermal plasma reactor 50 is illustrated. In particular, two to five parallel plate electrodes 52 are provided in the reactor and configured such that the mixed gas stream is directed along gaps 54 between the plate electrodes 52, such as was described hereinabove for the apparatuses of FIGS. 1 and 2.

The reaction chamber 50 of FIGS. 3A and 3B is constructed of aluminum with penetrations for the inlet 30 and the outlet 32 and high and low voltage terminals 56 and 58. The interior of the chamber 50 is overlaid with Kapton® high voltage tape while the upper portion is sealed with a rubber gasket 60 and a Plexiglas cover 62. The dielectrically-isolated electrodes 52 may range between approximately 6" to 8" wide by approximately 22" to 24" long, by approximately 0.09" to 0.125" thick. The electrodes 52 are configured to alternate between positive (high) or negative (low) charges and are separated by planar dielectrics 64, which may be constructed of conventional nonconductive materials, or even fluoropolymers or fluorocarbons. The planar dielectrics 64 have thicknesses which may be varied depending on the thickness of the gaps 54 that is desired. For example, the gap thickness may range between approximately 0.5 to 3.0 mm, rendering the total active volume of the reaction zone of the gaps 54 to range between 50.0 to 1,500 ml.

Figure 4A:
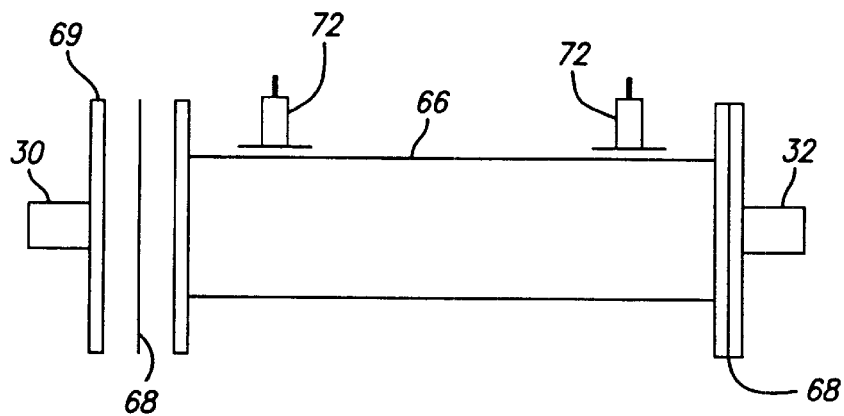
FIGS. 4A and 4B are a side, partially-exploded, elevational view and an end elevational view of another embodiment of a non-thermal plasma reactor utilizing planar electrodes.
Figure 4B:
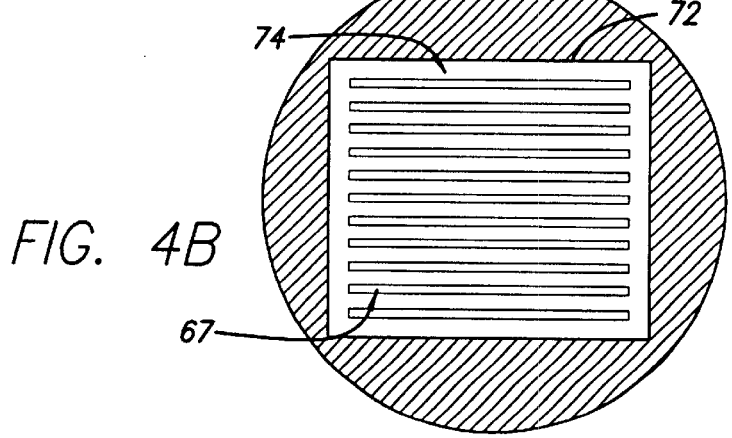

Another embodiment of the present invention using planar electrodes is illustrated in FIGS. 4A and 4B. A reaction chamber 66 is again constructed of aluminum and defines an interior region measuring approximately 8" by 8". The chamber 66 is approximately 31" in length and is fitted with the inlet 30 and the outlet 32 through which the gas stream 22 accesses and leaves the reaction zone 18 defined between electrodes 67. Silicone rubber gaskets 68 and end caps 69 may be used to seal the inlet 30 and the outlet 32, although a glass window (not shown) may be fitted in the end caps 69 to permit viewing of the interior of the chamber 66. Ceramic and copper high voltage terminals 72 are provided and may be obtained from Porcelain Products Company, Cary, Ohio, under part #32003.

Lining the interior of the reaction chamber 66 is a dielectric 74 of a fluoropolymeric material. The dielectric 74 may be configured with grooves of proper dimensions to enable the electrodes 67 to slide in and out of the chamber 66. The electrodes 67 are in alternating high and low configuration and connected to the high voltage terminals 72 at opposite ends of the chamber 66.

Figure 5:
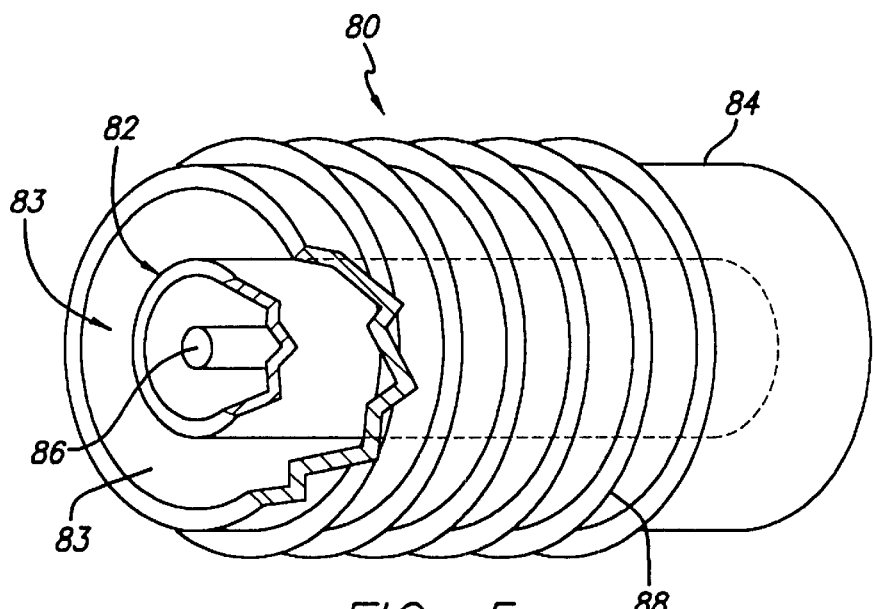
FIG. 5 is a perspective view of a non-thermal plasma reactor utilizing nonplanar electrodes.

As understood by one of ordinary skill in the art, the electrodes need not be planar. Referring to FIG. 5, a double dielectric non-thermal discharge tube or plasma reactor 80 may be used. In one embodiment, the reactor 80 has two coaxial glass tube dielectrics 82 and 84, both shown partially broken away. An inner electrode 86 being substantially a metallic wire conductor of, e.g., 8 gauge, copper wire, is positioned inside the inner dielectric 82. The inner dielectric 82 may be filled with a saltwater solution or small metallic spheres (not shown) to provide a conducting medium from the inner electrode 86 to the surface of the inner dielectric 82. Another metallic wire conductor is wound about the outer dielectric as the outer electrode 88, having one end connected to the grounded side of a high voltage transformer secondary. Both ends of the dielectrics are sealed with the exception of a small penetration for the high voltage connection.

A reaction zone 83 is defined between the dielectrics 82 and 84, wherein the inner dielectric 82 has a diameter of approximately 1.6 cm and the outer dielectric 84 has an inside diameter of approximately 2.3 cm. The reaction zone 18 therefore extends therebetween, in a gap of approximately 3.5 mm, with a total active volume of approximately 770 ml.

Depending on the capacity of the reactor or reactors, the flow rate may vary up to approximately 400 cubic feet per minute. As such, the residence time of the mixed gas in the reaction zone may be approximately 0.3 seconds, although it may range between 0.1 to 6.0 seconds.

It is understood by one of ordinary skill in the art that the electrodes have many different configurations, including those which combine the configurations discussed above.

Figure 6:
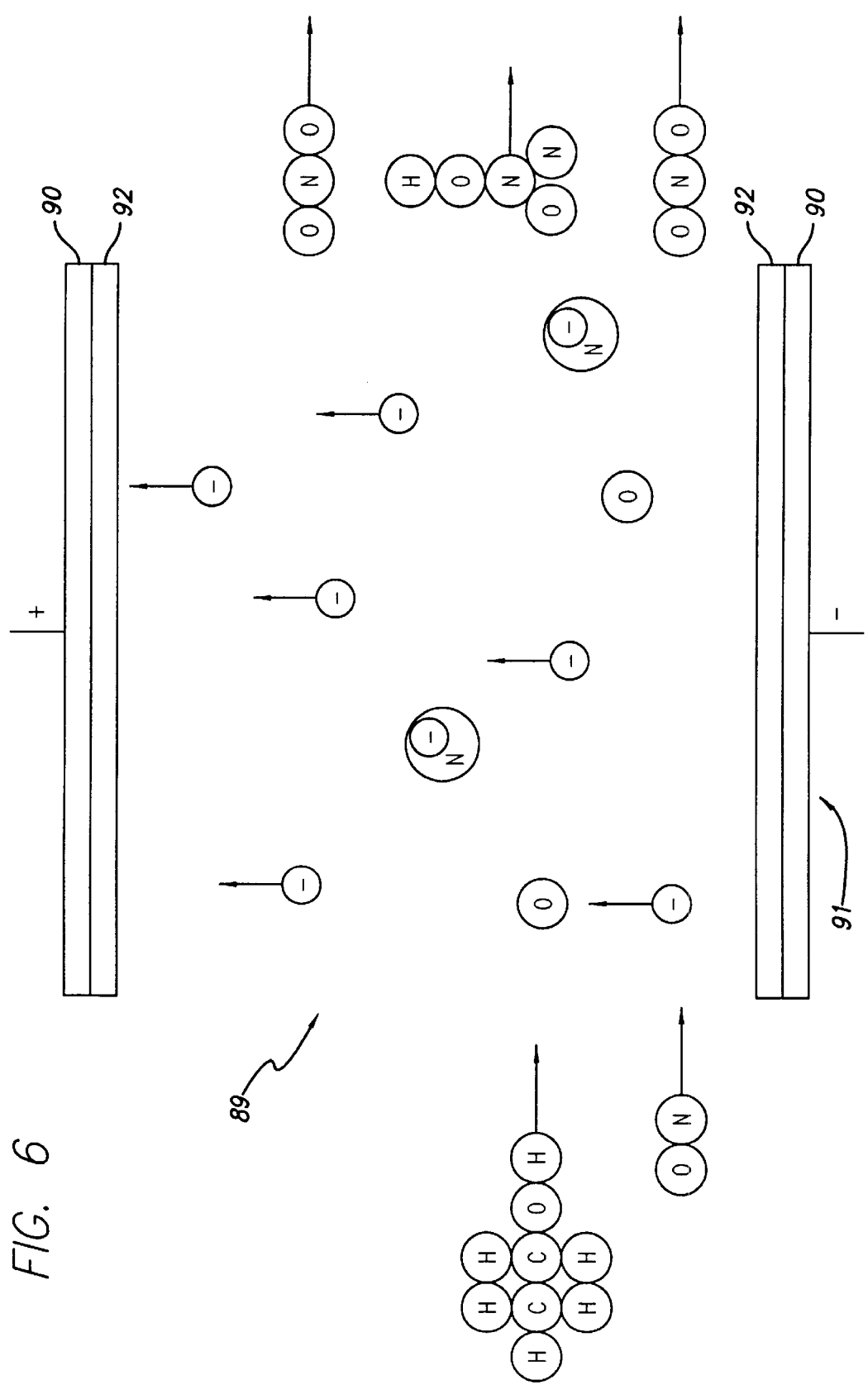
FIG. 6 depicts the chemical reactions and conversion of $NO_x$ involving ethanol as a preinjectant in the reaction zone of the non-thermal plasma apparatus of the present invention.

Regardless of the configuration of the electrodes, it has been observed that low energy gaseous plasma exhibit physical and chemical properties different than their normal properties. One such property is extreme chemical reactivity, which as discussed above, involves free electrons being energized in the electric field or corona until the electrons attain sufficient energy to cause ionization of some of the gas molecules. Referring to FIG. 6, reactions for $NO_x$ reduction using the free electron e generated in a reaction zone 89 of a reaction chamber 91 between electrodes 90 and corresponding dielectrics 92 representative of the electrodes and dielectrics of the above-described reactors, may be as follows:

$O_2+e \rightarrow 2O+e$ $N_2+e \rightarrow 2N+e$ $NO+e \rightarrow NO^*$ $NO^*+NO \rightarrow NO_2+N+e$ $NO^* \rightarrow N+O+e$ $N+O \rightarrow NO$ $N+N \rightarrow N_2$ $NO+O \rightarrow NO_2$ $2NO_2 \rightarrow N_2+2O_2$ With the preinjection of ethanol ($C_2H_5OH$) in accordance with feature of the present invention, several additional molecular compounds are possible, such as nitric acid ($HNO_3$) and even small amounts of peroxy acetyl nitrate, acetaldehyde, and n-propyl nitrate.

Figure 7:
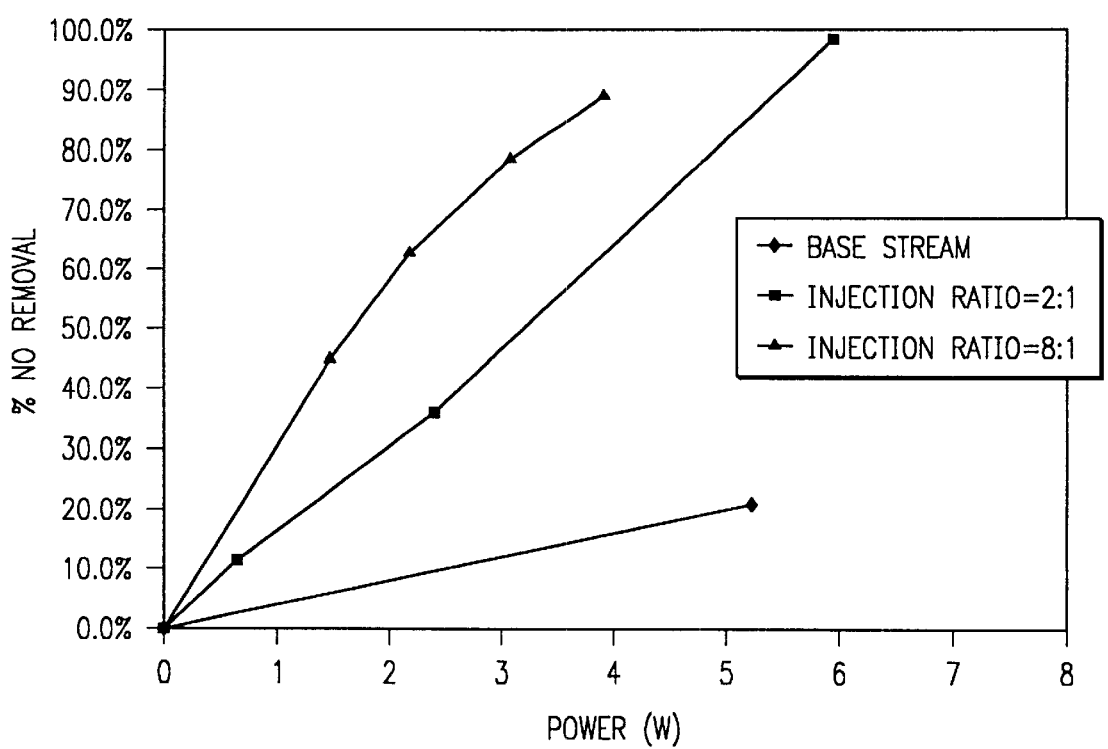
FIG. 7 is a graph of the percentage of NO removal as function of power of a non-thermal plasma apparatus of present invention.

As mentioned, the use of ethanol as a pre-injectant increases the efficiency of the non-thermal plasma apparatus by as much as a factor of ten. Referring to FIG. 7, the NO concentration in the gas stream without ethanol injectant (base stream) is compared to the NO concentration with ethanol injectant, using molar ratios of ethanol to initial NO of approximately 2:1 and 8:1. When injecting the ethanol at the higher ratio of 8:1, substantially 90% NO removal was obtained with only approximately 3.9 watts of plasma reactor power. The calculated molecular energy consumption for this data point was approximately 97 eV/Molecule, representing a greater than ten fold decrease in energy consumption as compared to the gas stream with no ethanol injectant. Higher ethanol injection ratios, e.g., 17:1 and 25:1, may also be applied; however, NO removal may be most efficient at approximately the 8:1 injection ratio.

Improvements in efficiencies were observed when treating $NO_x$ contained in diesel generator exhaust. Referring to Table I, results of an untreated stream were compared with results of a stream treated with approximately 4.0 ml/min. of ethanol injectant.

TABLE I

Ethanol Injection Performance in Diesel Exhaust Stream

| Condition | Percent NO Reduction | Electron Volts/Molecule |
|---|---|---|
| Ethanol Treated | 99.6 | 17.3 |
| Untreated | 17.3 | 170.4 |

As also mentioned, the ethanol offering a high vapor pressure and solubility in water offers ease in application. Its characteristic high vapor pressure renders it to be readily injected into the gas stream in either vapor or liquid form. Its high solubility in water also ensures that it may be readily scrubbed from the system along with the converted nitrogen dioxide ($No_2$) from the exiting gas stream using a conventional water scrubber 90 downstream from the reaction chamber 12 as shown in FIGS. 1 and 2.

In comparison to other preinjection compounds, an increase in efficiency may be achieved, however, not without increased complication in the overall process and apparatus. Many hydrocarbons have a lower vapor pressure which makes injection into the gas stream difficult except in higher temperature conditions. Also, as the gas stream cools, the injectant tends to condense on the surface of the electrodes shorting out the voltage circuit. Other possible injectants are not water soluble and therefore complicates the scrubbing process.

As illustrated in FIGS. 1 and 2, the reaction zone 18 between the dielectrics is pack-free, that is, free of any additional dielectric material, such as glass wool packing. Accordingly, the gas stream flows through the reaction zone substantially unimpeded.

It may be seen that the system of the present invention may be readily incorporated in various embodiments to provide a non-thermal plasma treatment of effluent or exhaust gas. It is understood by one of ordinary skill in the art that the voltage applied, the frequency of the voltage applied, the gas stream flow rate, temperature and residence time in the reaction chamber may affect power consumption and therefore efficiency of the methods and apparatus disclosed herein. These parameters may also be varied to generate specific reactive species and/or to target specific constituents in the exhaust gas for conversion.

The various components and dimensions disclosed herein are merely exemplary, and of course, various alternative techniques may be employed departing from those disclosed and suggested herein. For example, the electrodes may be variously configured as two dimensional or three dimensional conductive elements. They may be rectilinear or tubular, or combinations thereof.

Consequently, it is to be understood that the scope hereof should be determined in accordance with the claims as set forth below.

What is claimed is:

1. An apparatus for treating nitric oxide in exhaust gas to nitrogen dioxides, comprising:

an injector configured to introduce ethanol into said exhaust gas to form a mixed gas;

a non-thermal plasma reactor, comprising:

a plurality of electrodes configured to define at least one reaction zone through which the mixed gas travels;

a plurality of dielectrics configured to isolate at least a portion of the electrodes from the mixed gas; and a voltage supply connected to the electrodes to provide an electric field in the reaction zone; and a scrubber adapted to remove at least a portion of the ethanol from the mixed gas; wherein:

said injector is positioned upstream of said non-thermal plasma reactor and said scrubber is positioned downstream from said non-thermal plasma reactor.

2. An apparatus in accordance with claim 1, wherein the voltage supply provides a voltage to the electrodes such that the electric field has a field strength above a critical field strength of the mixed gas, but not so high as to establish a condition conducive to sustain arcing between the electrodes.

3. An apparatus in accordance with claim 1, wherein the electrodes are planar.

4. An apparatus in accordance with claim 1, wherein the electrodes are nonplanar.

5. An apparatus in accordance with claim 1, further comprising:

an ethanol bath; and a diverter diverting a portion of the exhaust gas to the ethanol bath and delivering the portion of the exhaust gas after passing through the ethanol bath to the injector.

6. An apparatus in accordance with claim 1, further comprising an ethanol reservoir and a metered pump.

* * * * *